Sept. 3, 1940. J. G. HUBBARD Re. 21,549

OPEN HEARTH VALVE

Original Filed March 9, 1937

Joseph Glen Hubbard
INVENTOR.

BY W. B. Harpman
ATTORNEY.

Reissued Sept. 3, 1940

Re. 21,549

UNITED STATES PATENT OFFICE 21,549

OPEN HEARTH VALVE

Joseph Glen Hubbard, Youngstown, Ohio

Original No. 2,106,913, dated February 1, 1938, Serial No. 129,832, March 9, 1937. Application for reissue September 12, 1939, Serial No. 294,508

4 Claims. (Cl. 251—84)

This invention relates to an open hearth fuel valve.

The principal object of this invention is to provide a valve particularly adapted to control the flow of fuel to an open hearth furnace.

A further object of this invention is to provide a valve so constructed that in full off position it will provide a positive leakproof closure.

A still further object of this invention is the provision of a valve adapted to control fuel for an open hearth furnace and to partially gasify the same through the introduction of steam into the said valve.

In supplying fuel to open hearth furnaces it is highly desirable that an accurate means of control be provided, as well as one which is convenient to operate. At the present time the majority of the fuel control means on open hearth furnaces comprise a series of ordinary wheel valves which must be individually set to supply the proper mixture of tar and oil and the various other substances used for fuel. Thus, at best, the fuel supply is chiefly a matter of guess work as there is no means provided for determining the correct amount or the quality of the fuel being supplied. In my invention I have provided a valve that, to a great degree, overcomes these obstacles in that it provides a single means of control, means for gasifying the fuel, and means for determining the most desirable quantity of fuel passed.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing wherein.

Figure 1:
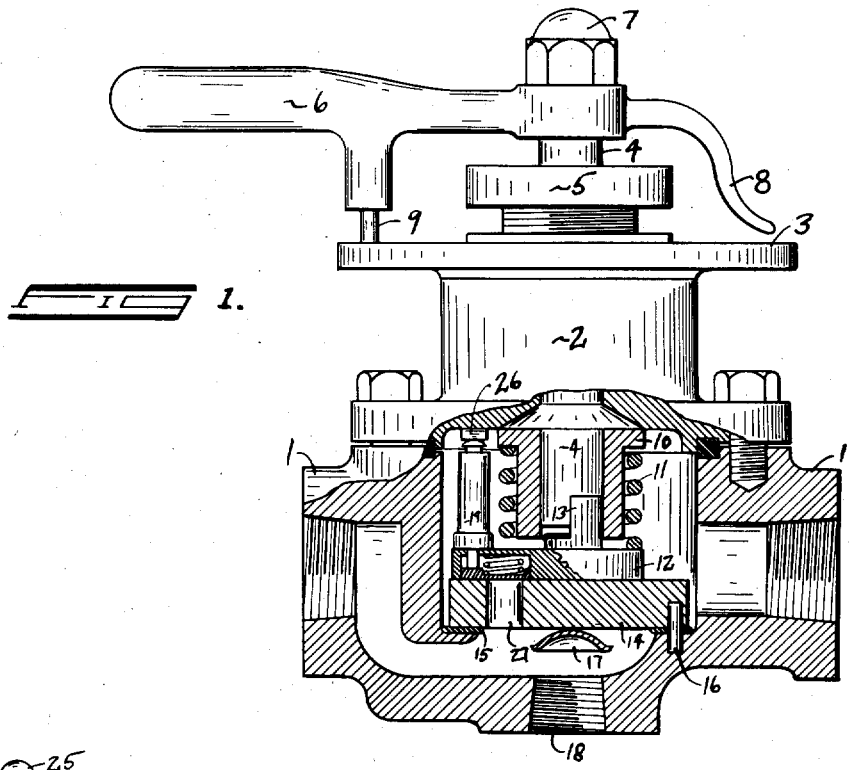
Figure 1 is a side elevation of the assembled valve with parts broken away and parts in cross section.

By referring to Figure 1 of the drawing it will be seen that the numeral 1 indicates a body portion of the valve which has bolted thereto an upper body portion 2, an enlarged circular upper section 3 of which is adapted to be suitably marked to show the various operating positions of the valve. A stem 4 is centrally positioned within these body portions and has positioned around its upper section a suitable gland and adjustment nut 5. The stem 4 may be provided with one or more annular grooves adjacent the gland so that the gland material imbeds itself in the said annular grooves when the gland is tightened thus serving to insure an efficient leak proof gland.

It will be seen by referring to Figure 1 of the drawing that the stem 4 is formed with an annular shoulder beveled to approximately 30° which is adapted to fit tightly though movably against a matching beveled portion of the inner surface of the upper body portion 2. A handle 6 is held in place on the upper end of the stem 4 by means of a nut 7. This handle 6 is provided with an indicator 8 and a friction catch 9. The lower end of the stem 4 extends within the interior of the body 1 and has positioned about it a bushing 10 and a coil spring 11, the bushing 10 serving to properly position the spring on the stem 4. Directly under the lower end of the stem 4 there is positioned a rotatable semi-cam shaped disk 12, an upright stem portion 13 of which engages the lower end of the stem 4. It will be seen that the stem structures provide for slight motion and loose fit so as to permit the semi-cam shaped disk 12 to align itself in relation to a circular disk 14 which is the valve seat and upon which the rotatable semi-cam shaped disk 12 is positioned, and which is provided with an opening 27 through which the material handled by the valve must pass, the rotatable cam shaped disk being shaped and positioned so that it very gradually covers or uncovers the opening 27 in the circular disk 14 when it is rotated. The circular disk 14 rests upon portions of the body 1 and a suitable gasket 15 is preferably positioned between the disk 14 and the body 1 to insure a tight connection, although it is possible to construct this valve with machine ground surfaces on the circular disk 14 and the body 1 so that a tight connection is obtained without the use of a gasket. In order to prevent any rotation of this circular disk 14 a pin is positioned partly within the same and partly within the body member 1, it being obvious that this circular disk 14 may be bolted to the body 1 or otherwise affixed thereto, or its shape changed to prevent the possibility of its rotating in relation to the body member 1. A bell shaped baffle 17 is formed on the lower side of this circular disk 14 and is adapted to equally distribute steam being injected through the threaded opening 18 in the body 1, the bell shaped baffle 17 may be eliminated from structures utilizing steam as a mixing agent if desired.

Figure 2:
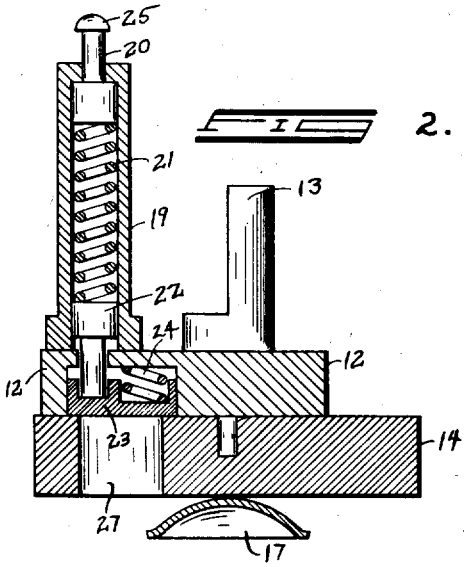
Figure 2 is an enlarged detail view of the interior portion of the valve shown in Figure 1.

One portion of this valve with which I am chiefly concerned is the unique construction of the closure means provided in the rotatable semi-cam shaped disk 12. This semi-cam shaped disk 12 will, through its cam-like shape, very gradually cover or uncover the opening 27 in the disk 14 as it is rotated thereon. In order that a positive closure may be made when a portion of the cam shaped disk 12 completely covers the opening in the disk 14, a button-like insert 23 has been positioned therein and a coil spring 24 placed between the insert 23 and the cam shaped disk 12 in order to exert tension upon the button-like insert 23. This button-like insert 23 performs a definite function in insuring a positive closure of the valve and in continually cleaning the surface of the disk 14 adjacent the opening 27 therein so as to prevent the accumulation of foreign material thereon which would otherwise interfere with the closure action of the valve. By referring to Figure 2 of the drawing it will be seen that a secondary spring tension member is provided on the cam shaped disk 12, which comprises an upright, hollow, cylindrical member 19 which has positioned within it a plunger 20, a coil spring 21, and a secondary plunger 22 the lower end of which extends downwardly into the rotatable cam shaped disk 12 and touches the button-like insert 23. The plunger 20 has a small knob 25 formed on its upper end after assembly which is adapted to contact a cam 26 (see Fig. 1) placed on an inside surface of the body member 2 at a position approximately over the opening 27 in the circular disk 14. This cam 26 is so placed that the plunger 20 will be forced downwardly when the knob 25 slides over it, thus compressing the spring 21 and causing extra tension downwardly through the plunger 22 and insert 23, thereby providing a more effective closure when the valve is in a full off position. At such times as the valve is in any of the various operating positions, the plunger 20 again rises to the position shown in Figure 2, thus releasing the extra tension previously supplied to the insert 23, as during this phase of the operating cycle the coil spring 24 supplies adequate pressure on this insert 23 to keep the valve seat clean.

Figure 3:
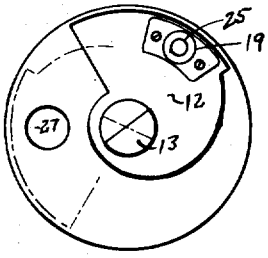
Figure 3 is a top plan view of the same interior portion of Figure 1 as shown in Figure 2.

By referring to Figure 3 it will be seen that the semi-cam shaped disk 12 has been turned partially to one side, thus placing the valve in a full on position. By continued turning in a clockwise direction the cam shaped disk 12 will very gradually cover the opening 27, thus effecting desirable control of the material being passed through the valve. It will thus be seen that the valve provides 270° of regulation and 90° of closure in its action and on its control indicator dial.

By referring again to Figure 1 it will be seen that the valve is designed to receive the fuel at the right side and eject it from the left side, and that the fuel at all times tends to force the semi-cam shaped disk downwardly upon the circular disk 14 which is its seat thus aiding in its positive closure. The opening 18 is provided to permit the insertion of steam at this point where it is suitably distributed and effectively mixed with the fuel by means of the baffle 17, thus producing a highly desirable gasifying action. It is obvious that this valve may be modified for controlling the flow of certain materials adapted to be handled at relatively low pressures by the elimination of certain portions of the valve structure. For example, the secondary spring tension arrangement herein specified can be eliminated, the resulting valve depending simply upon the closure action of the button-like insert 23 and its adjacent coil spring 24 or that the valve may be still further modified for the handling of material at still lower pressures by eliminating the button-like insert 23 together with its adjacent coil spring and the secondary spring tension arrangement herein specified, the resulting valve depending for its closure action upon the coil spring 11 bearing directly against the rotatable semi-cam shaped disk 12 which in turn rotates directly upon the circular disk 14 which is the seat of the valve 7.

It is obvious that this valve may be used in controlling the flow of material other than open hearth fuel as specified herein, as it is equally as efficient in controlling any other liquid, vapor, or gas.

What I claim is:

1. A valve comprising body members having a chamber provided with inlet and outlet connections, a disk within the chamber having an opening and means for controlling the area of said opening in the disk, said means comprising a cam shaped member having its axis coincident with said disk and having its edge portion adapted to cooperate with said opening to provide a variable area of opening between fully opened and fully closed position, an operating stem connected with said member and having a portion projecting exteriorly of the body members for controlling the setting of the edge of said member in relation to said opening, and spring pressed means carried in said member for sealing said opening when said member is moved to position to fully close the opening, a secondary spring tension means positioned on the said member designed to apply extra tension to the said spring pressed means and comprising a cylindrical member, a pair of plungers and a spring positioned within the said cylindrical member one of said plungers adapted to contact a cam formed on an inside surface of one of said body members, the other plunger bearing against the said spring pressed means.

2. A valve comprising body members having a chamber provided with inlet and outlet connections, a disk within the chamber having an opening and means for controlling the area of said opening in the disk, said means comprising a cam shaped member having its axis coincident with said disk and having its edge portion adapted to cooperate with said opening to provide a variable area of opening between fully opened and fully closed position, an operating stem connected with said member and having a portion projecting exteriorly of the body members for controlling the setting of the edge of said member in relation to said opening, and spring pressed means carried in said member for sealing said opening when said member is moved to position to fully close the opening, a secondary spring tension means positioned on the said member designed to apply extra tension to the said spring pressed means and comprising a cylindrical member, a pair of plungers and a spring positioned within the said cylindrical member one of said plungers adapted to contact a cam formed on an inside surface of one of said body members, the other plunger bearing against the said spring pressed means, said spring pressed means comprising a button-like insert positioned in said cam shaped member.

3. A valve comprising body members having a chamber provided with inlet and outlet connections, a disk within the chamber having an opening and means for controlling the area of said opening in the disk, said means comprising a cam shaped member having its axis coincident with said disk and having its edge portion adapted to cooperate with said opening to provide a variable area of opening between fully opened and fully closed position, an operating stem connected with said member and having a portion projecting exteriorly of the body members for controlling the setting of the edge of said member in relation to said opening, and spring pressed means carried in said member for sealing said opening when said member is moved to position to fully close the opening, a secondary spring tension means positioned on the said member designed to apply extra tension to the said spring pressed means and comprising a cylindrical member, a pair of plungers and a spring positioned within the said cylindrical member one of said plungers adapted to contact a cam formed on an inside surface of one of said body members, the other plunger bearing against the said spring pressed means, means for gasifying the material being handled in the valve by mixing steam therewith, said means comprising an opening in one of said body members and a bell shaped baffle formed on the bottom of said disk at a point over the said opening.

4. A valve comprising body members having a chamber provided with inlet and outlet connections, a disk within the chamber having an opening and means for controlling the area of said opening in the disk, said means comprising a cam shaped member having its axis coincident with said disk and having its edge portion adapted to cooperate with said opening to provide a variable area of opening between fully opened and fully closed position, an operating stem connected with said member and having a portion projecting exteriorly of the body members for controlling the setting of the edge of said member in relation to said opening, and spring pressed means carried in said member for sealing said opening when said member is moved to position to fully close the opening, a secondary spring tension means positioned on the said member designed to apply extra tension to the said spring pressed means and comprising a cylindrical member, a pair of plungers and a spring positioned within the said cylindrical member, one of said plungers adapted to contact a cam formed on an inside surface of one of said body members, the other plunger bearing against the said spring pressed means, said spring pressed means comprising a button-like insert positioned in said cam shaped member, means for gasifying the material being handled in the valve by mixing steam therewith, said means comprising an opening in one of said body members and a bell shaped baffle formed on the bottom of said disk at a point over the said opening.

JOSEPH GLEN HUBBARD.